United States Patent
Hartman et al.

(10) Patent No.: US 6,798,441 B2
(45) Date of Patent: *Sep. 28, 2004

(54) TELECONFERENCE SYSTEM WITH PERSONAL PRESENCE CELLS

(75) Inventors: Davis H. Hartman, Scottsdale, AZ (US); Fred Vincent Richard, Scottsdale, AZ (US); Diana Chen, Gilbert, AZ (US); Karen E. Jachimowicz, Laveen, AZ (US); Barbara McNeill Foley, Phoenix, AZ (US); William Peterson, Chandler, AZ (US); Earnest J. Johnson, Mesa, AZ (US)

(73) Assignee: Motorola, Inc., Schaumburg, IL (US)

( * ) Notice: Subject to any disclaimer, the term of this patent is extended or adjusted under 35 U.S.C. 154(b) by 126 days.

This patent is subject to a terminal disclaimer.

(21) Appl. No.: 09/865,840

(22) Filed: May 25, 2001

(65) Prior Publication Data

US 2001/0024229 A1 Sep. 27, 2001

Related U.S. Application Data

(62) Division of application No. 09/186,714, filed on Nov. 5, 1998, now Pat. No. 6,275,251.

(51) Int. Cl.$^7$ ............................................. H04N 7/14
(52) U.S. Cl. ........................ 348/14.08; 348/14.09; 348/14.16
(58) Field of Search .................... 348/14.01–14.09, 348/14.1, 14.11, 14.12, 14.13, 14.16; 345/753, 751; 709/204, 205; H04N 7/14

(56) References Cited

U.S. PATENT DOCUMENTS

| | | | | |
|---|---|---|---|---|
| 5,280,540 A | * | 1/1994 | Addeo et al. | 348/14.08 |
| 5,532,736 A | * | 7/1996 | Kuriki et al. | 348/20 |
| 5,612,733 A | * | 3/1997 | Flohr | 348/14.08 |
| 5,652,666 A | * | 7/1997 | Florence et al. | 348/40 |
| 5,677,728 A | * | 10/1997 | Schoolman | 348/14 |
| 6,037,970 A | * | 3/2000 | Kondo | 348/14.08 |

FOREIGN PATENT DOCUMENTS

| | | | | |
|---|---|---|---|---|
| JP | 406253303 A | * | 9/1994 | H04N/7/15 |
| JP | 407072551 A | * | 3/1996 | G03B/21/62 |
| JP | 408125956 A | * | 5/1996 | H04N/5/74 |
| JP | 409182045 A | * | 7/1997 | H04N/7/15 |
| JP | 410240109 A | * | 9/1998 | G03H/1/22 |

OTHER PUBLICATIONS

Managing North Carolina Information Highway, Brackett et al., IEEE publication, Dec. 1994.*

* cited by examiner

Primary Examiner—Melur Ramakrishnaiah
(74) Attorney, Agent, or Firm—William E. Koch

(57) ABSTRACT

A teleconference system including a plurality of personal presence cells positioned at a local communication site and at a remote communication site. The plurality of personal presence cells are characterized as either sensor cells or display cells. The sensor cells include at least one video camera positioned to sense and transmit an image of the local participant, and an image screen positioned to reflect an image of the local participant toward the at least one video camera and for viewing of an image through the screen. The display cells each include at least one projection display positioned to display a multi-dimensional image of a remote participant on a display screen. A transmission link interfaces the plurality of personal presence cells positioned at the local communication site and the plurality of presence cells positioned at the remote communication site.

10 Claims, 3 Drawing Sheets

TELECONFERENCE SYSTEM WITH PERSONAL PRESENCE CELLS

This is a divisional of application Ser. No. 09/186,714 filed Nov. 5, 1998, now U.S. Pat. No. 6,275,251.

FIELD OF THE INVENTION

The present invention pertains to the field of teleconference systems, and more particularly to a teleconference system including personal presence cells.

BACKGROUND OF THE INVENTION

The human visual system is a complex system with a great ability to absorb vast amounts of information originating in many varying formats, including visual displays. Visual displays are found in varying sizes and forms in today's world, displaying many types of information, from large visual display screens announcing scheduling information found in airports, to small visual displays, such as those incorporated into pocket calculators. Of current concern is the display of images when utilizing teleconferencing technology and teleconference display devices.

Industry experts estimate that there are as many as 10 million conference rooms world wide and approximately 10 million business meetings every day. Other studies show that 37 percent of employee time is spent in these meetings. Yet, video conferencing has not yet become widely accepted in offices and conference rooms in that current video conferencing technology cannot produce a communication environment as effective as face-to-face conversation between multi-participants (more than two).

Face-to face conversation is universally recognized as the preferred form of human communication. In a typical teleconferencing system, a pair of terminals, each with a video camera and a video display device, a microphone, and a speaker, are connected by a telecommunication link to permit face-to-face communication at a distance. However, such systems known today while utilizing this face-to-face communication standard have failed to address that communication is best when video conference communicants feel as though they are a part of a realistic multi-participant scene and feel some sense of presence between the individual local communicants and the individual distant communicants. In addition, this sense of presence includes the ability to participate with specific individual communicants when in a group conference setting.

A survey of the currently available videoconferencing systems show most systems generally fall into one of two categories: group conferencing system or single user system. The first category involves a single screen or display shared by a group of participants at a specific site, hereinafter referred to as site A, and the second category includes multiple screens thereby allowing each teleconference participant to have their own screen. During operation of a single display, or the first category type system, the screen at the local participants site displays an image of a group of participants at a remote site or remote sites. Interaction is through shared audio, video and data equipment. Sophistication of this type of system and their ability to capture the nuances of human interaction is in the design of speakers, microphones, cameras, display terminals, the data coding and multiplexing techniques and transmission technology.

The second category type system involves the use of multiple screens, such as personal computers, for each participant thereby allowing them to interact with other members of the conference from their own office or any other remote site, as long as it is properly equipped. However, capturing of human interaction nuances, such as eye contact, simultaneous observation of body language of various participants within the meeting, can be severely limited, since each site is isolated. Attempts have been made to overcome these limitations by creating systems that capture the images of each individual participant and reposition these images onto an artificial background, so they appear to be in a meeting room together. These systems do not succeed in bringing the nuances of human interaction to the forefront. In fact, it could be argued that they add an extra layer of separation amongst the participants.

Thus, there is a need for a teleconferencing system that creates a realistic presence amongst the sites and between the individual local and distant participants.

It is a purpose of the present invention to provide for a new and improved teleconference system that provides for the use of personal presence cells to create a realistic presence of participants utilizing the teleconference system including the display of personal interaction nuances.

It is a further purpose of the present invention to provide for a new and improved teleconference system that provides for visual and audio equipment, thereby generating a real sense of participation between a local participant and a distant participant.

It is yet still another purpose of the present invention to provide for teleconference between a single local participant and multiple remote participants, or between multiple local participants and multiple remote participants, while maintaining a real sense of presence between all participants utilizing the system.

SUMMARY OF THE INVENTION

The above problems and others are substantially solved and the above purposes and others are realized in a teleconference system including a plurality of personal presence cells positioned at a local site and at least one remote site. Each personal presence cell is characterized as either a sensor cell or a display cell. Each sensor cell serves to sense, or capture information such as audio, and video of a local participant. The display cell serves to present a realistic duplication of a remote participant viewable by the local participant. The plurality of personal presence cells are interfaced by a transmission link which provides for the transmission of information between the plurality of personal presence cells.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

DETAILED DESCRIPTION OF THE PREFERRED EMBODIMENT

During the course of this description, like numbers are used to identify like elements according to the different figures that illustrate the invention. The present invention provides for a communication system, more particularly a teleconference system, that includes a plurality of personal presence cells to provide for the real-time transmission of a realistic multi-dimensional image between a local participant and at least one remote participant. The teleconference system as disclosed provides for the display of a realistic image so as to allow for the viewing of personal nuances and provide the users with a feeling of all parties being personally present.

Figure 1:
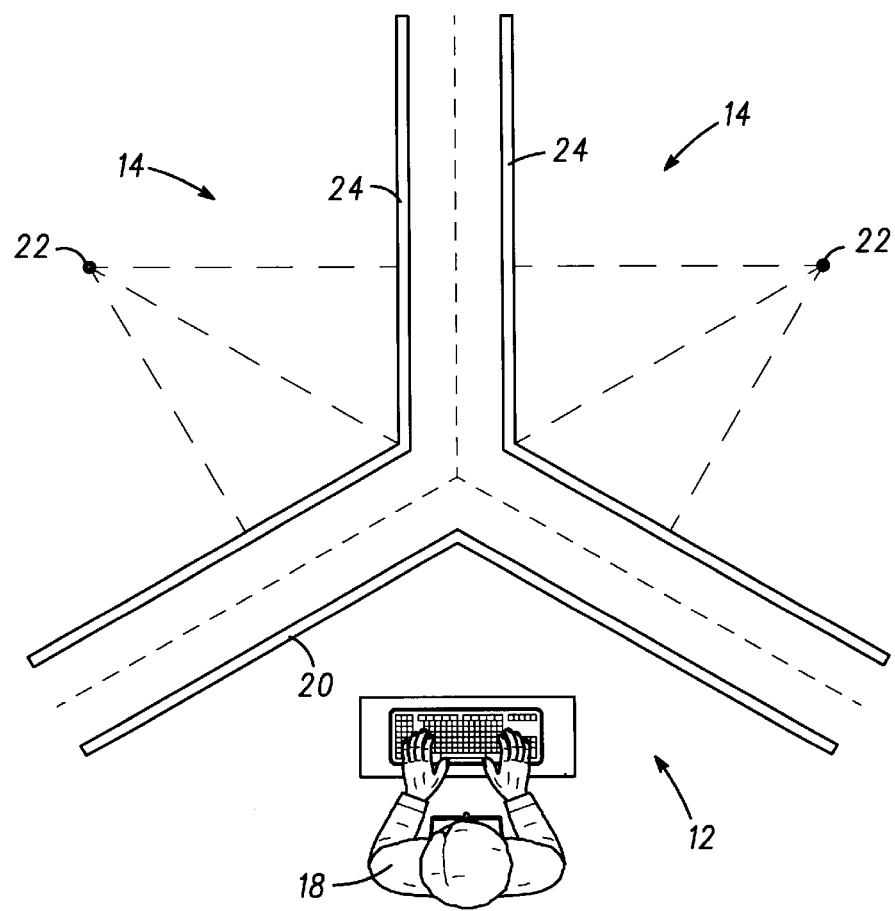
FIG. 1 is a simplified schematic view of a plurality of personal presence cells which compose a portion of the teleconference system of the present invention.
Figure 2:
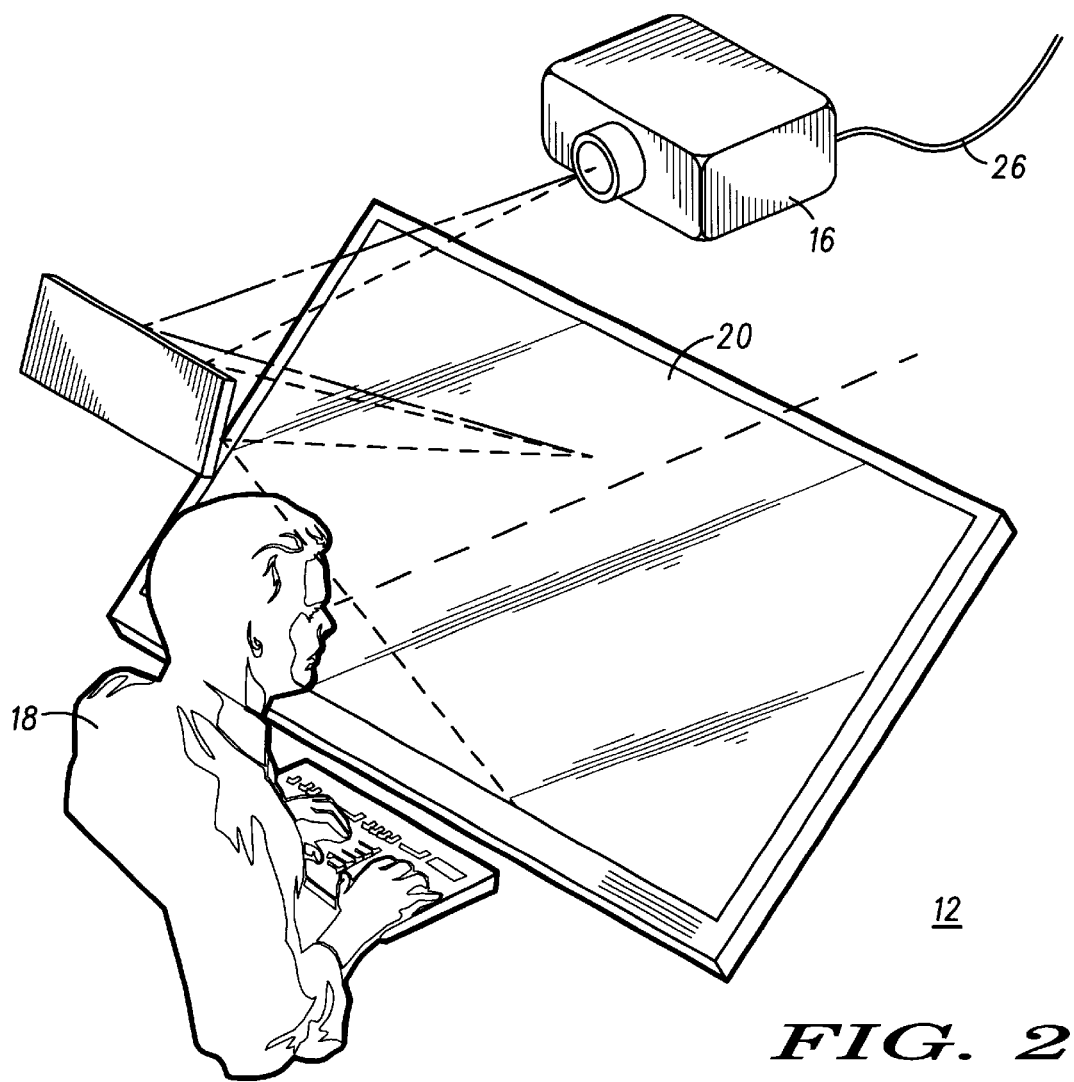
FIG. 2 is a simplified schematic side view of a user positioned at a sensor cell according to the teleconference system of the present invention.

Referring now to FIGS. 1 and 2, illustrated in simplified schematic view is a plurality of personal presence cells which make up the teleconference system of the present invention and a simplified schematic view of a sensor cell, respectively. As illustrated in FIG. 1, in simplified schematic view, shown is a local portion of a teleconference system (discussed presently), more particularly a multi-participant telecommunication site, including a first plurality of personal presence cells, generally referenced 10. It should be understood that teleconference system 10 operates in conjunction with at least one additional similarly styled plurality of personal presence cells positioned at a remote location or site. Accordingly, for simplicity sake, a single grouping of personal presence cells will be detailed with the understanding that at least one additional compatible interfaced grouping of similarly styled personal presence cells is required for communicative operation of the teleconference system.

As previously stated, the teleconference system of the present invention typically includes a first plurality of personal presence cells, and at least one additional plurality of personal presence cells, also referred to as a remote personal presence cells, interfaced together utilizing a broadband transmission, or telecommunication, link, and thereby forming the teleconference system of the present invention. As illustrated, local portion of teleconference system 10, including the local personal presence cells, can more particularly be defined as including a sensor cell 12 and a plurality of display cells 14. It should be understood that any number of sensor cells and display cells can be utilized dependent upon system configuration, but that in the described preferred embodiment, a single sensor cell 12 and a plurality of display cells 14 are illustrated. For a larger number of participants, system symmetry implies an even number of participants with alternating display and sensor cells. Sensor cell 12 includes a video camera 16 which generally includes the ability to sense both image data and voice data, via an integrated microphone and speaker, and is positioned relative to a participant 18, to enable the sensing, or receipt, and thus ultimate transmission of the participants likeness. Video camera 16 is characterized as including the ability to sense stereoscopic video information and/or panoramic video information dependent upon chosen equipment and user input and controls.

Sensor cell 12, in addition, includes a partially transmissive/reflective image screen 20. Partially transmissive/reflective image screen 20 serves to reflect an image of participant 18 toward video camera 16 while allowing participant 18 to see therethrough in the direction of display cells 14.

In a preferred embodiment, each display cell 14 includes a compatible digital video projector 22 providing for the real-time display of the at least one remote participant (discussed presently) to the local participant 18 and vice versa. This inclusion of projectors 22, more particularly, a plurality of digital video display projectors, provides for the display of a near realistic image, thus allowing a sense of presence between the numerous participants.

Projectors 22 operate by optically projecting an image onto a display screen 24. The image is created by an image source, then magnified and projected onto diffuse display screen 24 on which the image is viewed. The image displayed by the image source, and subsequently projected onto screen 24, is updated at a speed of 60 Hz or faster, in order to create a smoothly moving video image with no flicker. The image source creates the image by any number of light creation and modulation means, creating and/or modulating red, green, and blue images and combining these into a full color image. During operation of this preferred embodiment of the teleconference system of the present invention, projectors 22 utilize these video projection techniques and provide for the display of a near realistic image on display screen 24 which is viewable by participant 18 through screen 20.

Video camera 16 and projectors 22 are interfaced utilizing a broadband transmission link 26 (as illustrated in FIG. 2), respectively, to a processor (not shown). The interfaced processor provides for the processing of voice, data, and video images necessary for the transmission of information between the local participants and at least one remote participant. Typically, the processor would include a video codec, an audio codec, multiplexer/demultiplexer and a communication service unit (CSU). During operation, voice and image information, are encoded by audio and video codecs at the transmitting end and decoded at the receiving end. The compressed audio/video/data information is multiplexed by the multiplexer and coded in the format for transmission by the communication service unit at the transmitting end. The coded information is received by the communication service unit and demultiplexed by the demultiplexer and decoded by the audio and video codecs at the receiving end. In a preferred embodiment, transmission link 26 operates at a speed of 128 megabytes per second or faster. During image transmission, the human visual system processes and interprets information no faster than approximately 60 Hz. Accordingly, image data transmitted at a speed of $\frac{1}{60}$ of a second or faster is seen by the eyes of the viewer as one integrated image.

In projecting the realistic multi-dimensional image on display screen 24 at a remote site, data from sensor cell 12 is received by the remote distant teleconference system, more particularly a remote display cell, transmitted via the CSU, the demultiplexer and video/audio codec to digital video projector 22. Accordingly, a real-time projection display image is viewable by the remote participant. As previously described, an image of the remote participant is similarly transmitted to local participant 18 via transmission link 26. Accordingly, local participant 18 and the remote participant, appear to each other to be real in presence in that real-time projection display technology is utilized leading to real presence display. In a preferred embodiment, the teleconferencing physical environment, i.e. table, etc., are identical in appearance at local and remote locations to add to the sense of realism. In addition, it is anticipated by this disclosure to include within each sensor cell, an optional individual monitor (not shown) to allow for the display of presentation or the like having included as a part thereof a means for interaction.

Transmission link 26 leads to an interface with the remote communicant teleconference system. Transmission link 26 generally includes a broadband telecommunications link operating at a minimum speed of 128 megabytes per second, interfacing local communicant teleconference system 10 and the at least one remote communicant teleconference system which is similarly styled including the plurality of personal presence cells discussed presently.

Figure 3:
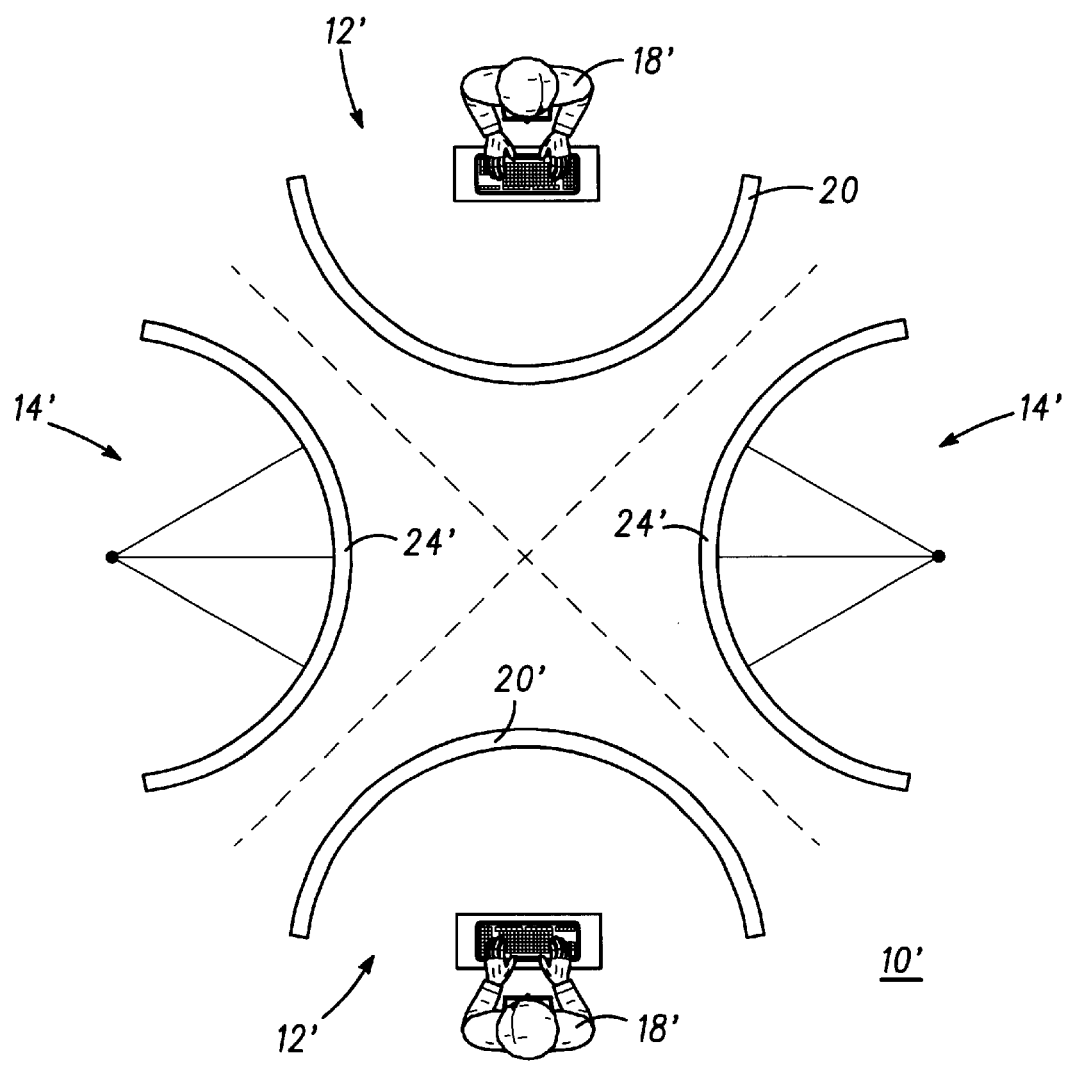
FIG. 3 is a simplified schematic view of a plurality of personal presence cells which compose a portion of the teleconference system of the present invention.

Referring now to FIG. 3, illustrated in simplified schematic view is an alternative embodiment of a portion of a teleconference system, more particularly a plurality of personal presence cells, generally referenced 10'. Teleconference system 10' includes a plurality of display cells 14', generally similar to display cells 14 of FIG. 1 and a plurality of sensor cells 12', generally similar to sensor cell 12 of FIG. 1. In this particular embodiment, there exists two local participants 18', thus two sensor cells 12'. This inclusion of a plurality of sensor cells 12' would allow for the use of teleconference system 10' by a plurality of local participants 18'. In additions, teleconference system 10' includes multi-faced display screens 24' and multi-faceted image screens 20'. As illustrated, multi-faceted display screens 24' and image screens 20' are arced or semi-circular in design, thus providing for a realistic image of the displayed image of the remote participants.

Figure 4:
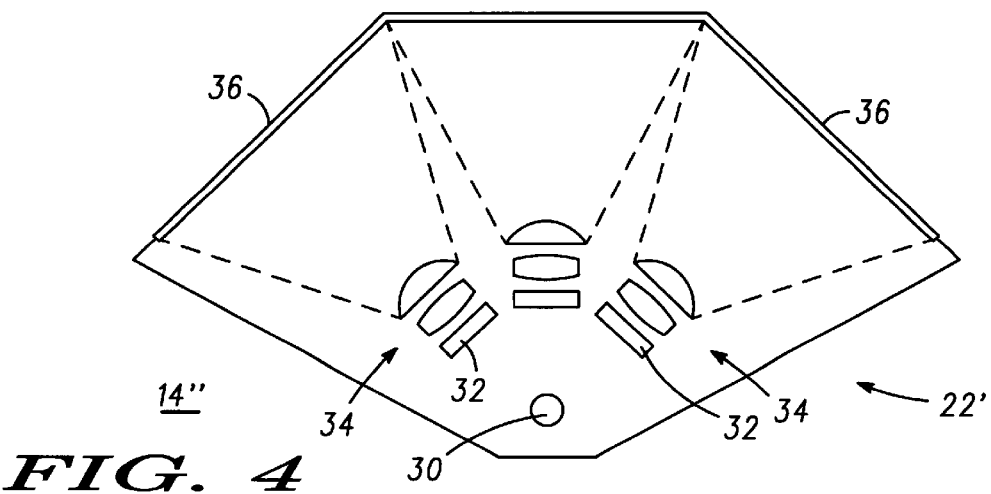
FIG. 4 is a simplified schematic top view of a preferred embodiment of a display cell including a projection display according to the teleconference system of the present invention.

Referring now to FIG. 4, illustrated is a simplified schematic view of a display cell 14', generally similar to display cell 14 of FIG. 1, except in this particular embodiment, the display cell is designed for a teleconferencing system having six participants, three local and three remote. In a preferred embodiment, display cell 14' includes a rear projection display which in its simplest embodiment would include a video rate color liquid crystal display projector, each displaying a video stream obtained from the camera positioned within the sensor cell (previously described). It should be understood that in the alternative, a front projection display can be utilized within display cell 14'. As illustrated, display cell 14' includes projection display 22'. Projection display 22' typically includes a projection light source 30, a miniature transmissive video-rate liquid crystal display 32, projection optics 34 and a directionally diffuse display screen 36, generally similar to display screen 24 of FIG. 1.

It should be understood that alternative light sources and displays are anticipated by this disclosure including, cathode ray tubes (CRTs), field emission displays (FEDs), laser projection displays including a light modulator and x and y deflectors, transmissive liquid crystal light modulators with a light source, reflective liquid crystal light modulators with a light source, machined silicon light modulators, organic electroluminescent displays, inorganic electroluminescent displays, and plasma displays.

During operation of the teleconference system of the present invention, an image is displayed for viewing on directionally diffuse display screen 36, generally similar to display screen 24 of FIG. 1. In a preferred embodiment, display screen 36 is multi-faceted thereby allowing for the multi-dimensional viewing of the image of the teleconference participant. This multi-dimensional viewing provides for a realistic image to be viewed by all participants, leading to the feeling of a sense of presence amongst all participants. Eye contact and thus realism amongst the various participants would be enabled by insuring the proper visual and auditory cues. This implies that the multiple display screens utilized between the various participants be closely parallel and that auditory responses be matched with head positions, etc.

In an alternative embodiment of display cell 14, projector display 22 includes holographic video projectors and operates by utilizing appropriate optical and signal processing architectures. The holographic video projector typically includes the ability to diffract light coming from a monochromatic light source. This diffraction of light is accomplished by modulating the phase or amplitude of light coming from the light source and recreating an approximation of a calculated wavefront. This wavefront is processed by an imaging system, which is updated at a speed of no less than $\frac{1}{60}^{th}$ of a second or greater. During operation of this embodiment of the teleconference system of the present invention, the holographic projectors utilize these holographic video projection techniques and provide for the display of a near realistic holographic image which is viewable by participant 18. Further information regarding the use of a digital holographic cameras and projection techniques can be found in co-pending U.S. patent application, bearing attorney's Ser. No. CR 98-079, entitled "COMMUNICATION SYSTEM WITH HOLOGRAPHIC VIDEO PROJECTOR", filed simultaneously herewith, assigned to the same assignee and incorporated herein by this reference.

Figure 5:
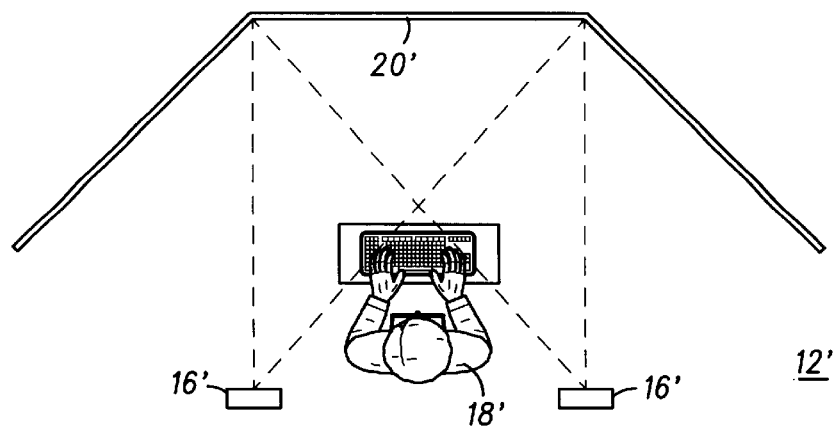
FIG. 5 is a simplified schematic top view of a sensor cell including stereoscopic video cameras according to the teleconference system of the present invention.

Additional, embodiments are anticipated by this disclosure including a teleconference system which includes the ability to generate a true three-dimensional display. Referring now to FIG. 5, illustrated in simplified schematic view is a sensor cell, generally similar to sensor cell 12 of FIG. 1, referenced here as 12'. Although there are many techniques for creating a three-dimensional projection systems, in this particular embodiment each single camera integrated as a part of sensor cell 12' is a dual camera, generally referenced 16', and characterized as taking left and right eye views of teleconference participant 18', and each projector (not shown) integrated as a part of the display cell (previously described) would project both the left and right eye views. The use of multiple cameras and projectors would therefore provide for the viewing of a three-dimensional image by all participants of the teleconference system.

Thus, disclosed is a new and improved teleconference system, which provides for a sense of real presence between the local communicant and at least one additional distant communicant due to the use of a plurality of personal presence cells including sensor cells and display cells.

While we have shown and described specific embodiments of the present invention, further modifications and improvement will occur to those skilled in the art. We desire it to be understood, therefore, that this invention is not limited to the particular forms shown and we intend in the appended claims to cover all modifications that do not depart from the spirit and scope of this invention.

What is claimed is:

1. A personal presence cell characterized as including at least one sensor cell and a plurality of display cells, configured to form a multi-participant telecommunication site, the at least one sensor cell including at least one video camera positioned to sense and transmit an image of a participant at a first communication site, and a multi-faceted diffuse image screen positioned to reflect an image of the participant at the first communication site toward the at least one video camera and for viewing of an image through the multi-faceted diffuse image screen, the plurality of display cells each including at least one projection display positioned to display a multi-dimensional holographic image of a participant at a second communication site.

2. A personal presence call as claimed in claim 1 wherein the video camera is capable of sensing image data and voice data of the participant.

3. A personal presence cell as claimed in claim 2 wherein the video camera includes an integrated microphone and a speaker.

4. A personal presence cell as claimed in claim 2 wherein the video camera is characterized as sensing at least one of stereoscopic video information or panoramic video information.

5. A personal presence cell as claimed in claim 1 wherein the multi-faceted diffuse image screen included as a part of the at least one sensor cell is partially transmissive and partially reflective.

6. A personal presence cell as claimed in claim 1 wherein the projection display projector is characterized as providing real-time display technology.

7. A personal presence cell as claimed in claim 1 wherein the projection display is a digital video display projector.

8. A personal presence cell as claimed in claim 1 wherein the projection display includes an image source, optics, and a display screen.

9. A personal presence cell as claimed in claim 1 wherein the projection display is a rear projection display system.

10. A personal presence cell as claimed in claim 1 wherein the projection display is a front projection display system.

* * * * *